Figure 8:
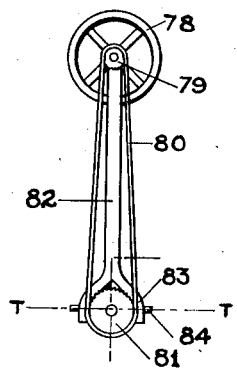

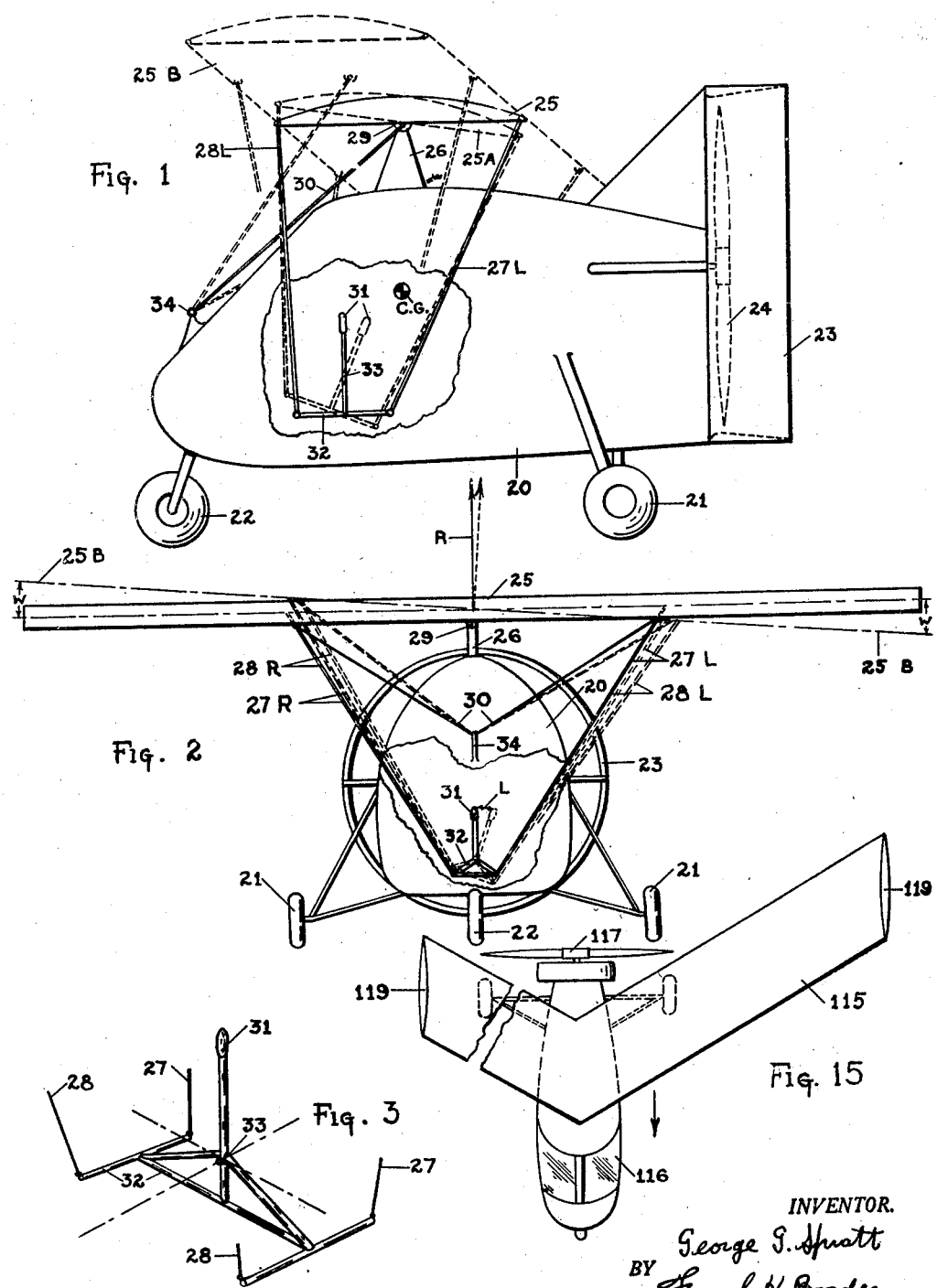
Aug. 23, 1938.  G. G. SPRATT  2,128,060
AIRCRAFT
Filed March 4, 1936  3 Sheets-Sheet 1
INVENTOR.
George G. Spratt
BY Frank H. Borden
ATTORNEYS.

Aug. 23, 1938.　　　G. G. SPRATT　　　2,128,060
AIRCRAFT
Filed March 4, 1936　　　3 Sheets-Sheet 2
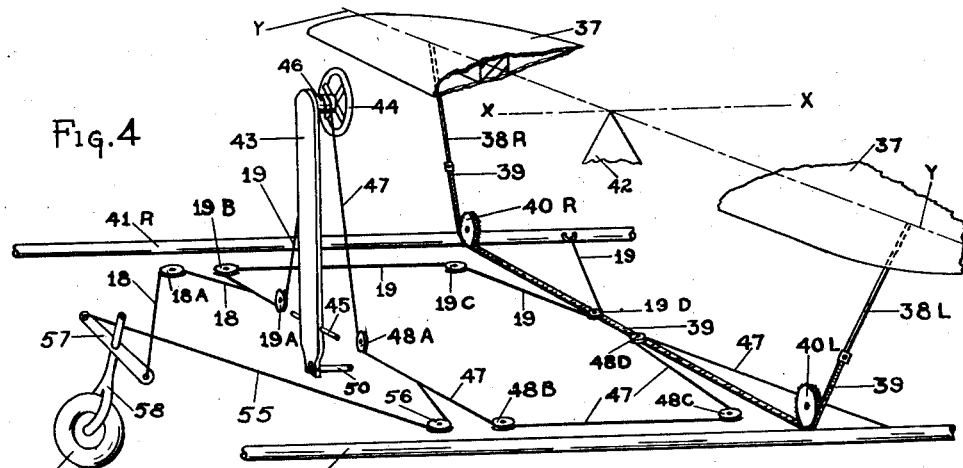
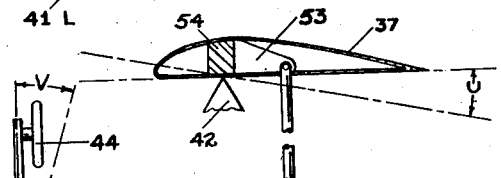
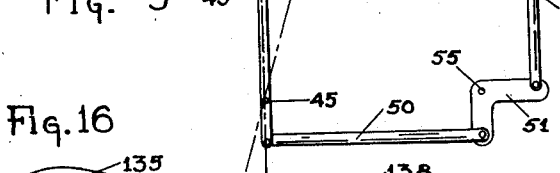
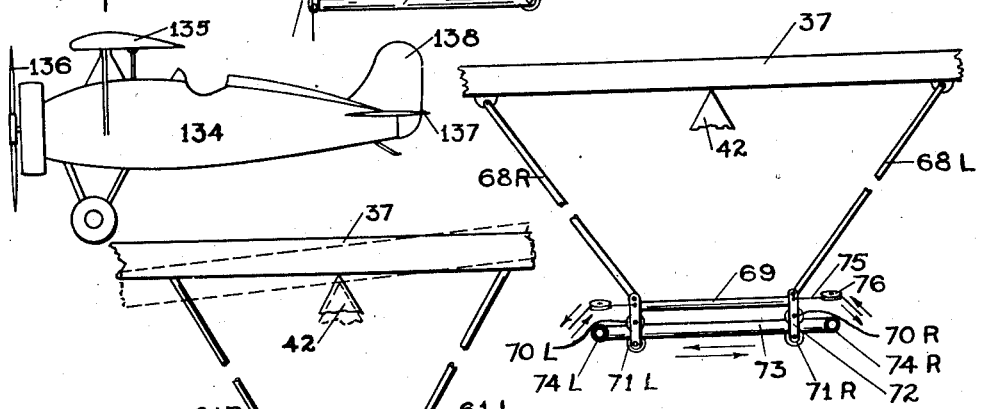
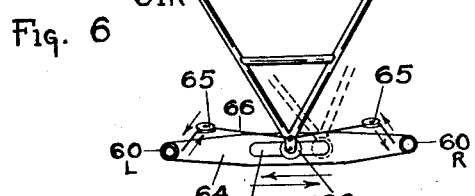
INVENTOR.
George G. Spratt
BY Frank H. Borden
ATTORNEY.

Aug. 23, 1938.                G. G. SPRATT                 2,128,060
                                AIRCRAFT
                           Filed March 4, 1936          3 Sheets-Sheet 3

INVENTOR.
George G. Spratt
BY Frank H. Borden
ATTORNEY.

Patented Aug. 23, 1938

2,128,060

UNITED STATES PATENT OFFICE 2,128,060

AIRCRAFT

George G. Spratt, Coatesville, Pa.

Application March 4, 1936, Serial No. 67,115

11 Claims. (Cl. 244—75)

This invention relates to aircraft.

The primary object of this invention is to produce an airplane which has improved control and is not dependent on ailerons or a tail for control. In the past airplanes have usually been controlled longitudinally by an elevator attached to a tail located usually far behind the center of gravity, and laterally by ailerons located near the tips of the wings. This form of control is open to certain objections. First, that its power depends on velocity of the craft so that control surfaces designed to be powerful enough for slow speeds are six to nine times too powerful at high speeds, which imposes heavier structures than necessary. Second, a long tail is required and wing structure has to be made strong enough to take full torque of control.

With the present invention the wing may be tilted both laterally and longitudinally for control in both of these directions. The lateral tilting controls the plane both laterally and directionally with one single movement. Thus, when the wing is tilted laterally the resultant lift force vector is inclined sideways. This produces a side component at the wing hinge which is high above the c. g. of the craft and causes the latter to slip or move sideways toward the low end of the wing. As soon as the slip gets large enough a force is produced on the tail back of the c. g. which causes the craft to turn directionally toward the slip. This produces a centrifugal force which opposes the slip and the steady condition requires that the slip force inward equals the lateral resistance outward plus centrifugal force outward. This condition results in a banking angle several times as large as the original angular displacement of the wing. Hence, it has been found in practice that four to five degrees of wing displacement is sufficient for all ordinary maneuvers of commercial or non-acrobatic flying. This method of tilting the wing laterally to obtain lateral and directional control may be used in combination with an elevator for longitudinal control, but it is preferably used and is shown in combination with a longitudinal control which is effected by tilting the wing fore and aft about a lateral axis. It is recognized that earlier patentees disclosed fore and aft tilting of the wing by which longitudinal control only was secured.

Further objects of this invention are to provide a method of lateral control which not only is suitable for a straight wing of considerable aspect ratio, but is also effective on swept-back wings which would otherwise be difficult to control.

Another object is to provide a wing which can easily be swung around lengthwise with the fuselage to allow the craft to be run along a roadway.

Another object is to provide a tail surface which acts both as damping area and as rearward fin surface and also as a propeller guard for road use.

The structure by which these objects are attained will appear clearly to those skilled in the art upon reference to the drawings, in which Fig. 1 is a side view of an aircraft which embodies this invention, Fig. 2 is a front view of the craft shown in Fig. 1, Fig. 3 is a perspective drawing of the control member used in the craft shown in Figs. 1 and 2, Fig. 4 is a perspective drawing of a different type of lateral control from that shown in Figs. 1 and 2, Fig. 5 is a side view of the longitudinal control system used with the lateral control shown in Fig. 4, Fig. 6 is a front view of an alternate method of wing bracing which could be used with the lateral control system of Fig. 4.

Fig. 7 is a front view of another alternate form of wing bracing which could be used with control system shown in Fig. 4.

Figure 9:
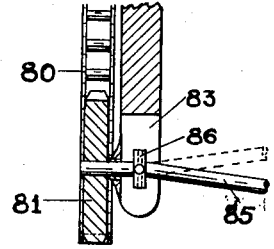
Figure 10:
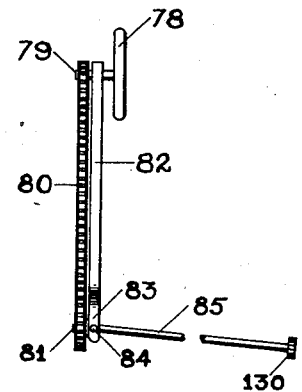
Figure 11:
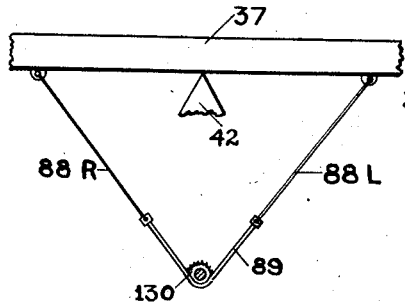
Figures 13, 14:
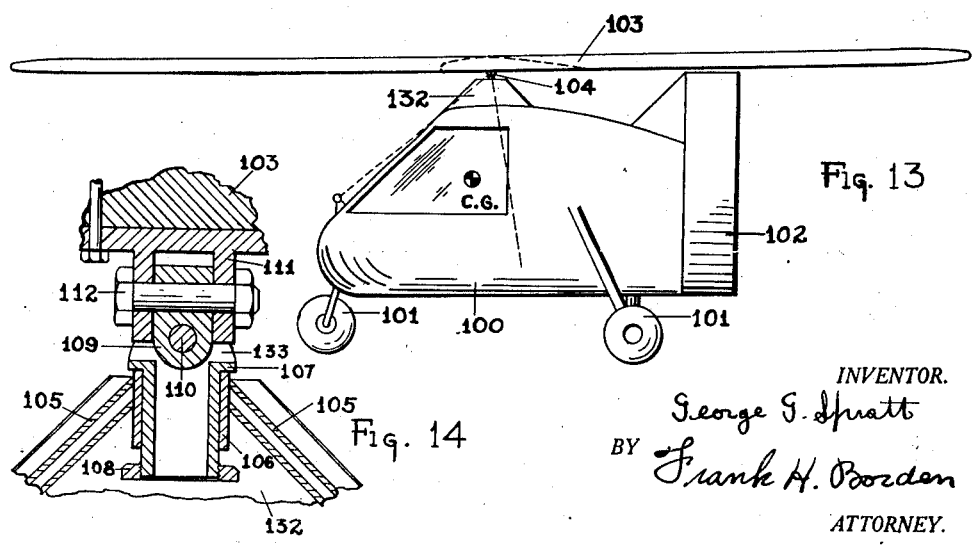

Fig. 8 is a front view of a wheel control which uses a shaft for the lateral tilting, Fig. 9 is a section of the control shown in Fig. 8 taken along the vertical center line, Fig. 10 is a side view of the wheel control shown in Fig. 8, Fig. 11 is a front view of one form of wing bracing which could be used with the control shown in Figs. 8, 9 and 10, Fig. 12 is a front view of another type of wing bracing which could be used with the control shown in Figs. 8, 9 and 10, Fig. 13 is a side view of an aircraft showing the wing turned parallel to the axis of the aircraft for making it roadable, Fig. 14 is an enlarged detail view of a joint which could be used for tilting and for rotating the wing, Fig. 15 is a top view of an aircraft having a swept-back wing which could be used in connection with tilting, and Fig. 16 shows a further modification of the invention.

Referring to Figs. 1, 2 and 3, numeral 20 represents the body, 21 a pair of landing gear wheels supporting the body when on the ground, and 22 represents a single central landing wheel also supporting the body when on the ground. A ring-shaped tail 23 surrounds the preferably pusher propeller 24 driven by a motor (not shown) for forward propulsion. The wing 25 is pivotally connected to the body 20 by pylon 26 by a universal joint 29. The wing 25 in this embodiment has two spars (not shown) at its front and rear edges and is braced by four wires 27R and 27L at the rear and 28R and 28L at the front. The wing 25 is prevented from rotating about its central point of support 29 by the wires 30 which run forward and downward from spaced points on the wing, convergently to a point 34 on the nose of the body 20. Located in the body within easy reach of the pilot's hand is the stick 31 which is rigidly attached to the braced H frame 32 and is strongly supported to the body frame at the point 33 for universal movement. Wires 27R and 27L and 28R and 28L are respectively connected to the four "corners" of the frame. By this structure it will be clear that the weight of the wing when the craft is on the ground is all taken at the central point through joint 29 and pylon 26, but when in the air the lift of the wing is taken by the four lift wires 27R, 27L and 28R and 28L, and the load passes through the H piece 32 to the joint 33 into the body 20. It is obvious with the wing, as shown in full lines in Fig. 1, that a fore and aft movement of the stick 31 causes the wing to rock; i. e., pulling the stick 31 back to the dotted position shown in Fig. 1 pulls down on the rear wires 27R and 27L and lets the front wires 28R and 28L rise, thus causing the wing to assume position shown in dotted lines in Fig. 1.

If the stick 31 is moved sideways to the dotted position shown in Fig. 2, the wing is tilted sideways to the dotted position shown in Fig. 2. However, due to the downward slope of the wires 30 the lateral tilting is accompanied by a twist, the side which goes up goes forward at the same time so that the position in dotted lines in Fig. 2 would appear as the secondary dotted position shown in Fig. 1. Thus, the lateral motion of the stick 31, indicated by angle L Fig. 2, causes the wing to rotate about an axis joining points 34 and 29, indicated by angle W in Fig. 2. The slope of this axis is not a necessary feature of this control but it is preferable and improves the action of the lateral control, since it tends to make the wing meet the relative air more nearly at right angles when the machine is in a turn and the wing is slipping inward, and hence the air is coming to the body at an angle of yaw, but to the wing at an angle of less yaw, and consequently with greater wing efficiency.

Referring now to Figs. 4 and 5, the tilting control is shown in a different embodiment. In this form the wing is thick and has only one spar and hence only one set of lift wires. The stick is replaced by a wheel and the front wheel steering is joined with lateral wing control, as hereinafter described.

Fig. 4 shows the lateral control system with front wheel connections. The wing 37 is preferably thick and, illustratively, merely is described and disclosed as comprised of one spar as 54, Fig. 5. The wing 37 is supported by the pylon 42 and braced by wires 38L and 38R, which may be attached to chain 39 extending or running around sprockets or pulleys 40L and 40R. Sprockets 40L and 40R are attached to the main structure of the body (not shown) represented by the longerons 41L and 41R. Mounted in the body and convenient to the pilot is the control column 43 carrying steering wheel 44. The column 43 hinges on axis 45 which is fastened to the body structure (not shown). Attached to the wheel 44 is the drum 46 around which the wire 47 is wound and is prevented from slipping by a fastening (not shown). The wire 47 is duplicated by another similar wire 19 on the other side of the control. Wire 47 goes down to a pulley 48A located close to the extension of axis 45, then through other pulleys 48B and 48C, on the longeron 41L to pulley 48D attached to chain 39 near its central point, then back to the longeron 41L where it is attached. On the other side of the drum 46, wire 19 follows a similar course to that of wire 47 and passes over pulleys 19A, 19B, 19C and 19D, on chain 39, and finally is fastened to the opposite longeron 41R. Attached to the wire 47 is the wire 55 which passes around a pulley 56 on the longeron 41L and is attached to a lever 57 fixed to the front wheel fork 58 in which front wheel 22 runs. A complemental wire 18 is connected to wire 19 and passes over pulley 18A to lever 57. Thus by turning the steering wheel 44, the drum 46 pulls in or lets out on wires 47 and 19. This changes the position of pulley 48D and 19D and moves the chain 39 to one side or the other, pulling on one of the wing brace wires 38L or 38R, causing the wing to tilt laterally about an axis indicated as XX in Fig. 4. At the same time wires 55 and 18 are either pulled in or let out so that the front wheel 22 is turned in the same direction as the wheel 44. Thus the steering on the ground is effected by the same wheel and in the same direction as it is in the air due to reversal of wires 18 and 55.

Referring now more particularly to Fig. 5, there is shown the longitudinal control which may be used with the lateral control shown in Fig. 4. The use of this type of longitudinal control, however, is not fundamentally necessary for the complete functioning of the lateral control which is one of the chief objects of this patent. Another type of longitudinal control, such as elevators attached to the tail of the plane (not shown), may be used. The type here shown tilts the main wing fore and aft for longitudinal control. The control column 43 is supported in the body structure and turns about the axis 45. On its lower end is pinned the push rod 50 which runs back to the bellcrank 51 which is supported by and hinges about the pin 55 which is fixed in the body structure. Pinned to the horizontal arm of bellcrank 51 is push rod 52 extending upward and having its upper end pinned to the arm 53 which is rigidly attached to the main spar 54 of the wing 37. Thus, when the control column 43 is moved by the pilot through an angle V, the wing 37 is caused to move through an angle U. Its axis of rotation is the line Y—Y in Fig. 4, which passes through the support 42 and the terminations of wires 38R and 38L.

Referring to Figs. 6 and 7, two alternate methods of bracing the wing 37 are shown. They both allow the use of struts in place of the wires 38L and 38R shown in Fig. 4, and hence allow much stronger and more rigid bracing of the wing. They both may be operated by the wheel control shown in Fig. 4, or by any other control. In Fig. 6 the wing 37 is braced by the two struts 61L and 61R whose lower ends intersect at one point. At this point the roller 62 is pinned at the point of intersection. This roller rolls in a slot 63 which is supported by the rigid member 64 interconnecting the longerons 60L and 66R so that the main lift loads from the wing are strongly transferred to the body frame, the longerons of which are indicated at 60R and 60L. Wires 66 may be attached to the intersection of struts 61R and 61L, and they may be run around pulleys as 65, so that pulling on the wires respectively causes the joint and roller 62 to move sideways in the slot 63 to some such position as is shown in dotted lines, thus causing the wing 37 to tilt sideways to the position shown in dotted lines.

The slot 63 may have any form. If it is straight, as shown then the wing 37 will move down slightly when tilted sideways and support 42 will have to be depressed to some other position such as that shown in dotted lines at 42. This action of the wing requires work to be done on it by the wires 66 in moving the joint and roller; so that the natural tendency of the wing and control system is to return to a central position as soon as manual load is removed. A certain amount of this tendency is desirable but too much is objectionable. Hence the form of the slot 63 may be altered to produce just the right amount of tendency for the wing to center its position automatically.

Referring now to Fig. 7. The wing 37 is braced by the two struts 68R and 68L which are pin jointed together at their lower ends by the member 69. At each of the joints between 68L and 68R and 69 is a carrier 72 containing two rollers; the upper one is represented by 70 and the lower by 71. These rollers fit snugly on a rail or bar 73 along which they can roll easily. This rail 73 is supported by the structure of the body. As for instance, the longerons 74R and 74L cables 75 are attached to the carriage 72 or to any other part of the assembly, which pass around pulleys as 76 and are operated by some control similar to that shown in Fig. 4. Thus by pulling on one cable and letting up on the opposite one, the assembly of struts 68, connector 69, carriage 72 and rollers 70 and 71 are moved along the rail 73. This causes the wing 37 to tilt laterally about its support 42 and due to the use of struts the bracing of the wing 37 is very rigid.

Referring now to Figs. 8, 9 and 10, another type of wheel control is disclosed which transmits its effect to the wing bracing by torsion of a shaft rather than by wires as shown in Fig. 4. The pilot's steering wheel 78 is journalled at the top of the control column 82 and is rigidly attached to the sprocket 79. At the bottom of the column 82 is the yoke 83 which carries the trunnions 84 which are journalled on the frame of the body (not shown). Thus for fore and aft control, the column hinges about the axis T—T so that as the column is rocked fore and aft about the axis T—T, the shaft 85 will articulate at the joint 86. The shaft 85 has attached to its back end the sprocket or gear 81 which operates the wing tilting as shown later in Figs. 11 and 12. It is obvious then that turning of the wheel 78 by the pilot, turns sprocket 79 and moves the chain 80 which drives the sprocket 81. This turns shaft 85 through universal joint 86 and operates the tilting wing through either the sprocket or gear 130.

Referring now to Fig. 11, the wing 37, supported at 42, is braced by wires 88L and 88R. These are attached to each end of a short chain 89. The chain 89 passes under the sprocket 130 which is strongly journalled in the frame of the body (not shown). The sprocket 130 is shown in Fig. 10 and it is evident that the turning of the control wheel 78 causes rotation of sprocket 130. Rotation of sprocket 130 pulls in on one side of the chain 89 and on one of the wires 88L or 88R, while the other side of the chain 89 and its complemental wire 88R or 88L is let out. This causes the wing 37 to tilt laterally, effecting control as described earlier.

Figure 12:
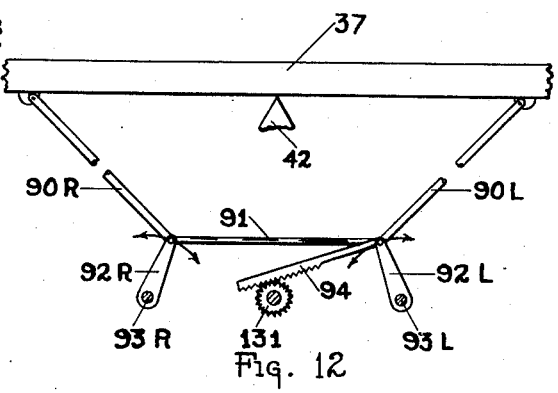

Referring to Fig. 12, the wing 37 supported at 42 is braced by the struts 90L and 90R. The lower ends of these struts are pinned to links 92L and 92R which are journalled on and oscillate about the longerons 93R and 93L, respectively, of the main structure or to another point connected to the main structure. Tie or cross member 91 connects the upper ends of links 92R and 92L. A rack 94 is pivotally connected to one of the links 92R or 92L, or to the member 91, whose teeth are meshed with the teeth of the gear 131. This gear 131 is analogous to sprocket 130 and is mounted similarly on shaft 85 as shown in Fig. 10 and is therefore turned by the turning of the control wheel. Rotation of gear 131 pulls the rack 94 either one way or the other and swings the links 92L and 92R about their fixed pivots. This causes one of the struts 90L or 90R to be pulled in while the opposite one is pushed out, thus causing the wing 37 to tilt.

Referring to Fig. 13, one of the secondary advantages of this invention is disclosed. Due to the fact that lateral control is obtained from tilting the wing laterally, while preferably the longitudinal control is obtained from tilting the wing fore and aft, the support for the wing is necessarily at a single point. Now, if the wing is allowed to rotate about this point about a substantially vertical axis a further advantage is obtained. In design of an efficient wing the breadth or distance across the wing has to be several times (four to six times) the chord or length from front edge to rear edge of the wing. This makes the span or breadth so wide that it could not be used on a road without blocking the road to other traffic. If, however, the wing is rotated so that its long axis lies fore and aft, then the width is reduced to a point where moving the machine on a highway is practicable and easy. In Fig. 13 a craft is shown whose wing is rotated for road travel. Reference character 100 represents the body, 101 the landing gear or road wheels, 102 the tail which is a circular ring surrounding and guarding the propeller (not shown). The wing in its roadable position is indicated in full lines in Fig. 13, the brace wires having been unfastened to allow it to be swung. The wing in its flying position is indicated in dotted lines in Fig. 13. The universal joint 104 is disposed between the wing 103 and the body 100 and allows both rocking and turning about a nearly vertical axis.

Fig. 14 shows a detail of universal joint 104. The body 100 includes a pylon 132, within which are disposed structural members 105 attached to substantially vertical sleeve 106. Fitting rotatably in sleeve 106 is the yoke 107 which is prevented from coming out by the nut 108. The upper end of yoke 107 has a slot between legs 133, in which the block 109 is fitted and is retained by the bolt or pin 110 which passes through both legs or sides 133 of the yoke 107 and block 109. The upper end of block 109 is transversely drilled for another bolt 112 at right angles to bolt 110. Bolt 112 also passes through the bifurcated fitting 111, which is attached to and forms a part of the wing 103. Thus the joint is completely universal about mutually perpendicular axes, namely, bolt 112, bolt 110 and yoke 107. This allows rocking sideways, rocking fore and aft and turning about a nearly vertical axis or any combination of these motions. Any other type of universal joint would come under the intent of this disclosure, but as there are so many of them, only this type is shown.

Referring now to Fig. 15. The previous description has contemplated the use of a wing of substantially rectangular planform or one of slightly tapered tips. However, Fig. 12 shows the planform of a wing which could be used with this invention. The wing 115 is swept back, the tips of the wing are considerably behind the center of gravity of the machine. The body 116 is driven by the propeller 117 and is conventional except that the lateral control is effected by rocking the wing sideways as discussed earlier in this disclosure. Fore and aft control is preferably controlled by fore and aft rocking of the wing 115, but may be obtained by elevators placed on the wing tips, but this is neither preferred nor shown. Directional stability is obtained by the fins 119 erected on the wing tips and which are behind the center of gravity. Structural members may be located in the wing as desired to carry the loads to the support points and to the bracing members. The advantage of this form of wing lies in the fact that the engine and propeller can be located close together with passengers in front, and still have the fin surface far enough back to give the craft sufficient directional stability. However, with normal control methods this type is difficult to control because a rolling moment applied to an aileron would give a pitching moment which would be objectionable.

Referring to Fig. 16, a conventional aircraft is shown comprising a fuselage 134, on which is mounted a wing 135, which may be rocked either sideways, or fore and aft, or both, in the manner previously disclosed. The form of the aircraft is conventional, being provided with a tractor propeller 136, and with an empennage consisting at least of horizontal stabilizer 137 and vertical fin 138 which may also include movable control surfaces such as rudder and elevator.

It will be understood that the aircraft described will function in accordance with the preliminary description.

It will also be understood that although the description has been limited to monoplane constructions, which are preferred, the use of multiple wings is also contemplated.

I claim:

1. Aircraft comprising a body, a wing pivotally mounted on the body substantially above the center of gravity of the aircraft, means for tilting the wing relative to the body so as to develop a lateral tilting and displacement of the craft, and means on the body to develop lateral resistance behind the center of gravity responsive to lateral displacement in order to change the direction of the aircraft, a pusher propeller disposed substantially behind the center of gravity, said last mentioned means comprising a short cylindrical ring substantially surrounding said propeller.

2. Aircraft comprising a body, a propeller rearward of the center of gravity of the body, a wing articulated to the body substantially above the center of gravity thereof by means of a universal pivot, means for tilting the wing relative to the body upon an axis lying in the plane of symmetry but angularly inclined upwardly and rearwardly from the longitudinal axis of the aircraft whereby lateral tilting of the wing relative to the body is accompanied by forward motion of the rising side of the wing, means including a relatively short substantially cylindrical ring of such diameter as to surround the propeller to position the lateral center of pressure of said body substantially behind the center of gravity to secure directional reaction from lateral displacement of the aircraft.

3. Aircraft comprising a body, a wing pivotally mounted on the body substantially above the center of gravity of the aircraft, means for tilting the wing relative to the body so as to develop a lateral tilting and displacement of the craft, and means on the body to develop lateral resistance behind the center of gravity responsive to lateral displacement in order to change the direction of the aircraft, a pusher propeller disposed substantially behind the center of gravity, said last mentioned means comprising a short cylindrical ring substantially surrounding said propeller, and means for tilting the wing relative to the body upon a transverse axis so as to develop longitudinal controlling functions.

4. Aircraft comprising a body, a wing connected to the body substantially above the center of gravity of the aircraft by means of a universal pivot, means for tilting the wing relative to the body so as to develop a lateral tilting, and means concurrently operative to effect a change in the angular relation between the span of the wing and the longitudinal axis of the body, and means for tilting the wing relative to the body upon a transverse axis so as to develop longitudinal controlling functions.

5. Aircraft comprising a body, a wing articulated to the body substantially above the center of gravity thereof by means of a universal pivot connection, means for confining the wing relative to the body to tilt upon an axis lying in the plane of symmetry but angularly inclined upwardly and rearwardly from the longitudinal axis of the aircraft whereby lateral tilting of the wing relative to the body is accomplished by forward motion of the rising side of the wing, and means for tilting the wing relative to the body upon a transverse axis so as to develop longitudinal controlling functions.

6. An airplane having a fuselage, a propeller at the rear of the fuselage, a fixed ring surrounding the propeller, a wing, and means including a pivot between the wing and the fuselage to connect the wing and the fuselage and to permit oscillation of the wing about an axis intersecting the longitudinal axis of the fuselage to directionally control the aircraft.

7. An airplane having a fuselage, a wing, means including a pivot between the wing and the fuselage to connect the wing and the fuselage and to permit oscillation of the wing about an axis intersecting the longitudinal axis of the fuselage to directionally control the aircraft, a propeller at the rear of the fuselage, and a ring surrounding the propeller to shift the lateral center of pressure of the fuselage to a point behind the center of gravity of the fuselage.

8. An airplane having a fuselage, a propeller at the rear of the fuselage, a fixed ring surrounding the propeller, a wing, means including a pivot between the wing and the fuselage to connect the wing and the fuselage and to permit oscillation of the wing about an axis intersecting the longitudinal axis of the fuselage to directionally control the aircraft, and means to rotate the wing through an angle of approximately ninety degrees to align the longitudinal axis of the wing with the longitudinal axis of the fuselage.

9. A tailless type aircraft comprising a body, a universal pivot mounting substantially above the center of gravity of the body, a main supporting wing carried by said mounting with the point of pivotation substantially in the plane of the wing, means to tilt the wing laterally with respect to the body and other means responsive to said lateral tilting to change the angular relation between the spanwise axis of the wing and the longitudinal axis of the body, said wing constituting the sole movable control surface.

10. A tailless type aircraft comprising a body, a universal pivot mounting substantially above the center of gravity of the body, a main supporting wing carried by said mounting with the point of pivotation substantially in the plane of the wing, a single wing controlling member connected to the wing and operable to tilt the wing to elevate or depress the craft, or to tilt it laterally for steering purposes, and means responsive to the lateral tilting to change the angular relation between the spanwise axis of the wing and the longitudinal axis of the body, said wing constituting the sole movable control surface.

11. A tailless type aircraft comprising a body, a universal pivot mounting substantially above the center of gravity of the body, a main supporting wing carried by said mounting with the point of pivotation substantially in the plane of the wing, a controlling lever movable on a universal pivot within the body, connecting means between the wing and the lever operable to tilt the wing to elevate and depress the craft when the lever is moved in fore and aft direction, and to laterally tilt the wing when the lever is moved sidewise, and means responsive to said lateral tilting to concurrently change the angular relation between the spanwise axis of the wing and the longitudinal axis of the body to steer the craft, said wing constituting the sole movable control surface.

GEORGE G. SPRATT.